United States Patent
Langford et al.

(10) Patent No.: US 6,907,496 B2
(45) Date of Patent: Jun. 14, 2005

(54) METHOD AND APPARATUS FOR AUTO-DETECTION OF A CONFIGURATION OF A FLASH MEMORY

(75) Inventors: John Steven Langford, Austin, TX (US); Michael Youhour Lim, Leander, TX (US); Hemlata Nellimarla, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/138,901

(22) Filed: May 2, 2002

(65) Prior Publication Data

US 2003/0208667 A1 Nov. 6, 2003

(51) Int. Cl.[7] .............................................. G06F 12/00
(52) U.S. Cl. ...................................................... 711/103
(58) Field of Search ......................................... 711/103

(56) References Cited

U.S. PATENT DOCUMENTS

| | | | | |
|---|---|---|---|---|
| 6,073,206 A | * | 6/2000 | Piwonka et al. ............ | 711/102 |
| 6,353,885 B1 | * | 3/2002 | Herzi et al. ................. | 713/1 |
| 6,564,995 B1 | * | 5/2003 | Montgomery ............... | 235/379 |
| 2003/0023793 A1 | * | 1/2003 | Mantey et al. .............. | 710/100 |

* cited by examiner

Primary Examiner—Matthew D. Anderson
(74) Attorney, Agent, or Firm—Duke W. Yee; Mark E. McBurney; Gerald H. Glanzman

(57) ABSTRACT

Method apparatus, and computer instructions for updating a flash memory. Information regarding the flash memory, for example, configuration and size information, is determined, and the determined information is then used to apply a code update to the flash memory. The invention allows for the same update program or tool to be used for data processing systems with different sizes or configurations of flash memories.

16 Claims, 3 Drawing Sheets

METHOD AND APPARATUS FOR AUTO-DETECTION OF A CONFIGURATION OF A FLASH MEMORY

BACKGROUND OF THE INVENTION

1. Technical Field

The present invention relates generally to an improved data processing system, and in particular, to a method and apparatus for updating data. Still more particularly, the present invention provides a method and apparatus for updating data in a flash memory system.

2. Description of Related Art

Memory is a computer's workspace. Memory is an important resource because the amount of memory present determines the size and number of programs that can be running at the same time, as well as the amount of data that can be processed instantly. All program execution and data processing takes place in memory. The program's instructions are copied into memory from disk or tape and then extracted from memory into the control unit circuit for analysis and execution. The instructions direct the computer to input data into memory from a keyboard, disk, tape or communications channel. Memory also is used to store programs or instructions used to initialize or start up a computer.

For example, a basic input output system (BIOS) is an essential set of routines in a computer in which the BIOS is stored on a memory chip and provides an interface between the operating system and the hardware. The BIOS supports all peripheral technologies and internal services such as a real time clock. A BIOS is typically stored on a flash memory. A flash memory is one or more memory chips that can be rewritten and hold content without power. Other types of instructions that may be stored on a flash memory include operating systems and word processors.

Stored programs must periodically be updated to keep pace with new technologies. The updates are made to the flash memory, which allows the instructions stored on the memory to be upgraded via software. The memory size and configuration of a flash memory is important in applying updates. For example, a flash memory may contain 16 MBs of memory in which the configuration may be one 16 MB chip or two 8 MB chips. The identification of the configuration is important because when a boundary between one flash memory chip and another flash memory chip is crossed when updating software or writing instructions to the flash memory, the next chip must be told that an upgrade is being performed. Thus, if the configuration is unknown, the upgrading of software may be difficult or impossible to perform.

Currently, upgrade tools are directed towards specific flash memories in which the memory size and configuration is pre-set or hard coded in the tool. As a result, developers are required to develop and maintain the software upgrade tools for many types of system platforms, which potentially have different flash memory sizes. Such a requirement involves many man-hours to support the different versions of an upgrade tool. In addition to the use of resources, confusion may occur as to which flash update tool is appropriate for a particular platform. Additionally, existing systems may be upgraded to include additional flash memory. Existing tools are unable to know that such an upgrade in memory has occurred. Thus, an upgrade may not be applied because the tool assumes that insufficient memory is present even though an addition of more flash memory provides sufficient storage space for the upgrade.

Therefore, it would be advantageous to have an improved method, apparatus, and computer instructions for upgrading flash memories.

SUMMARY OF THE INVENTION

The present invention provides a method, apparatus, and computer instructions for updating a flash memory. A configuration of the flash memory is determined to form an identified configuration. A code update is applied to the flash memory based on the identified configuration.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
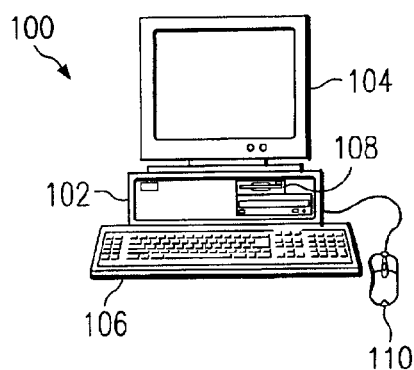
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
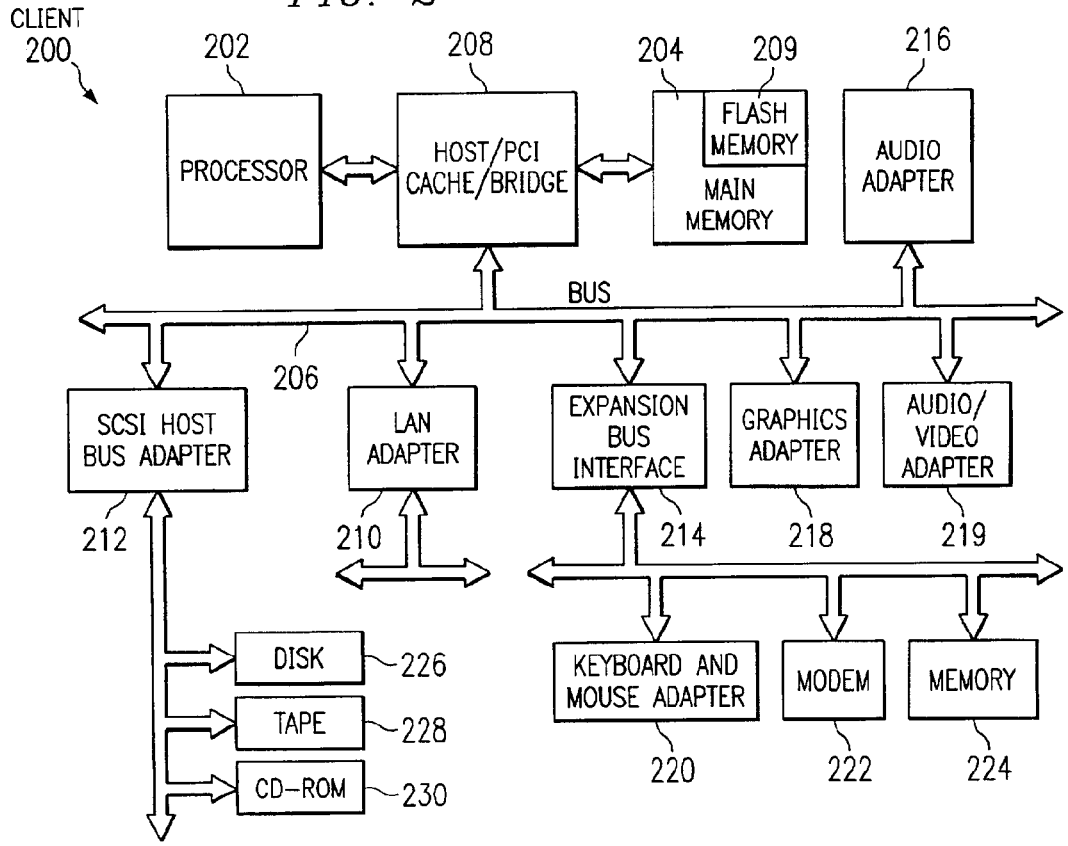
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. Additionally, main memory 204 also may include flash memory 209, which contains data or instructions. For example, flash memory 209 may contain a BIOS used to start up data processing system 200.

PCI bridge 208 may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection.

In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation.

Those of ordinary skill in the art will appreciate that the hardware in FIG. 2 may vary depending on the implementation. Other internal hardware or peripheral devices, such as flash read-only memory (ROM) or equivalent nonvolatile memory or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer, hand held computer, or a personal digital assistant (PDA). Data processing system 200 also may be a kiosk or a Web appliance.

The processes of the present invention are performed by processor 202 using computer implemented instructions, which may be located in a memory such as, for example, main memory 204, memory 224, or in one or more peripheral devices, such as hard disk drive 226, tape drive 228, and CD-ROM drive 230. More specifically, the present invention provides a flash update program to serve as a tool to reprogram or update data within flash memory chips. The mechanism of the present invention includes a process to detect the flash memory size and configuration. With this information, the same update program may be used for many different types of data processing systems having different sizes of flash memory.

Figure 3:
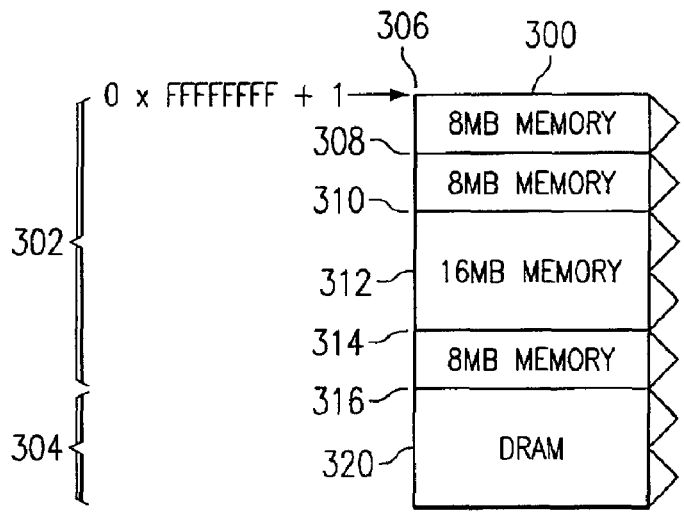
FIG. 3 is a diagram of a flash memory in accordance with a preferred embodiment of the present invention.

Turning next to FIG. 3, a diagram of a flash memory is depicted in accordance with a preferred embodiment of the present invention. Address space 300 includes addresses to a flash memory in section 302, which may correspond to flash memory 209 in FIG. 2. Additionally, address space 300 also includes addresses to dynamic random access memory in section 304, which may be found in main memory 204 in FIG. 2.

In this example, the process implemented in the update program begins at starting address 306, which is 0xFFFFFFFF+1 and scans or moves down 8 megabytes (MB) to address 308, which is address 0xFF800000. At that address, a check for geometry information is made. If geometry information is found, then a 8 MB chip is identified for address 308. This information is recorded or stored. In these examples, geometry information may be located by writing to an address without preparing the memory for a data write. Thereafter, a read of the address is performed. If geometry information is present, this information is returned. Otherwise, nothing occurs or an error may be returned.

In these examples, addresses are queried at 8 MB intervals because of current flash chip technology, 8 MB is the current minimum chip size in use. The illustrations assume that the geometry information is located near the beginning address for a flash memory chip. This location is always fixed for a particular line of flash memory chips.

Then, the process scans through another 8 MBs of memory to address 310, which is address 0xFF000000, and a check for geometry information is then made. In this example, geometry information is found identifying that a 8 MB flash memory chip is present at this address. Next, the process scans down an additional 8 MB to address 312. No geometry information is present at this address.

The process scans or moves down an additional 8 MBs to address 314, which is 0xFE000000. Geometry information is found when a check is made of this address. In this case, a 16 MB chip is identified. A scan is made down to address 316, which is 0xFD8000000. A check for geometry information indicates that such information is present at address 316. Another 8 MB chip is identified and reported.

Thereafter, the process scans down an additional 8 MBs of memory to address 320. A check for geometry information indicates that none is present at this address. Additional checks are made at 8 MB intervals until more than 64 MBs of memory have been checked for geometry information. At this point, it is assumed that the last flash memory chip has been detected and the process completes having identified that the flash memory is 40 MBs in size, containing three 8 MB chips and a single 16 MB chip.

This example assumed that the size of the flash memory chips is a multiple of 8 MBs and that no single flash memory chip is greater than 64 MB. If larger chips are used, then the check to determine when to stop scanning and checking for geometry information is set to that size. For example, if 128 MB chips may be present, then the scan continues until more than 128 MBs of memory have been scanned. Of course, other multiples other than 8 MBs may be used when scanning through the memory depending on the particular implementation.

Using this information, the updates to the flash memory may be applied. The configuration information is used to identify when a boundary between one flash memory chip and another flash memory chip is crossed so that each flash memory chip can be prepared for data writes by the upgrade program. The size information is used to determine whether sufficient storage space is available for the upgrade to be performed.

Figure 4:
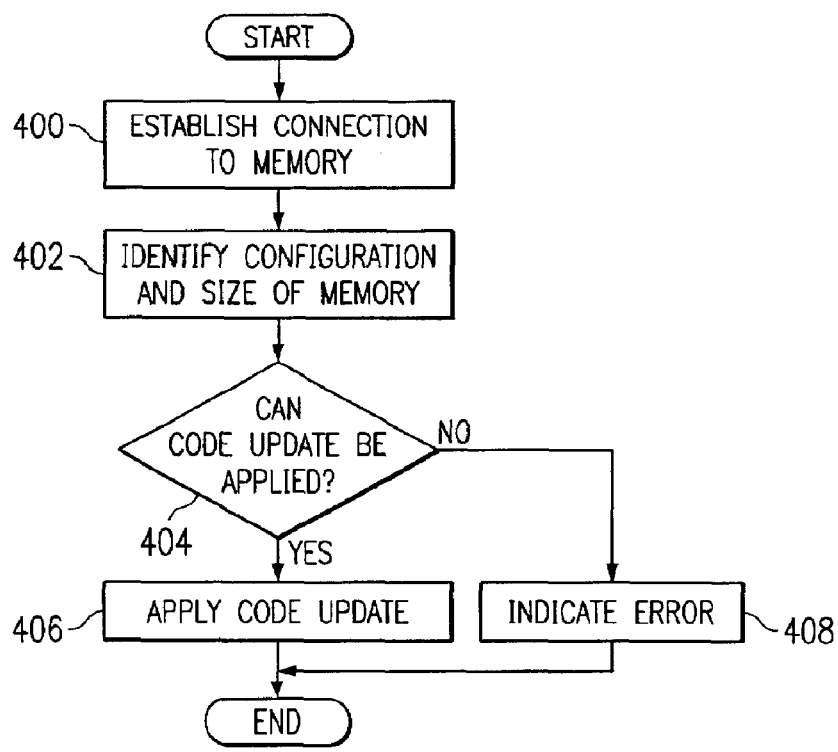
FIG. 4 is a flowchart of a process used for updating a flash memory in accordance with a preferred embodiment of the present invention.

With reference now to FIG. 4, a flowchart of a process used for updating a flash memory is depicted in accordance with a preferred embodiment of the present invention. The process illustrated in FIG. 4 may be implemented in a data processing system, such as data processing system 200 in FIG. 2. Specifically, the process may be implemented as a program executed by data processing system 200 to update a flash memory.

The process begins by establishing a connection to the memory (step 400). This connection may be established by obtaining access to an address space for the memory and the data processing system. The configuration and size of the memory is identified (step 402). The configuration and size of the memory is identified by scanning and performing geometry checks as described above.

A determination is made as to whether a code update can be applied (step 404). In some cases, the amount of memory in the flash memory may be insufficient to hold the code update. If a code update can be applied, the code update is applied (step 406) and the process terminates thereafter.

Referring again to step 404, if a code update cannot be applied, an error is indicated (step 408) and the process terminates.

Figure 5:
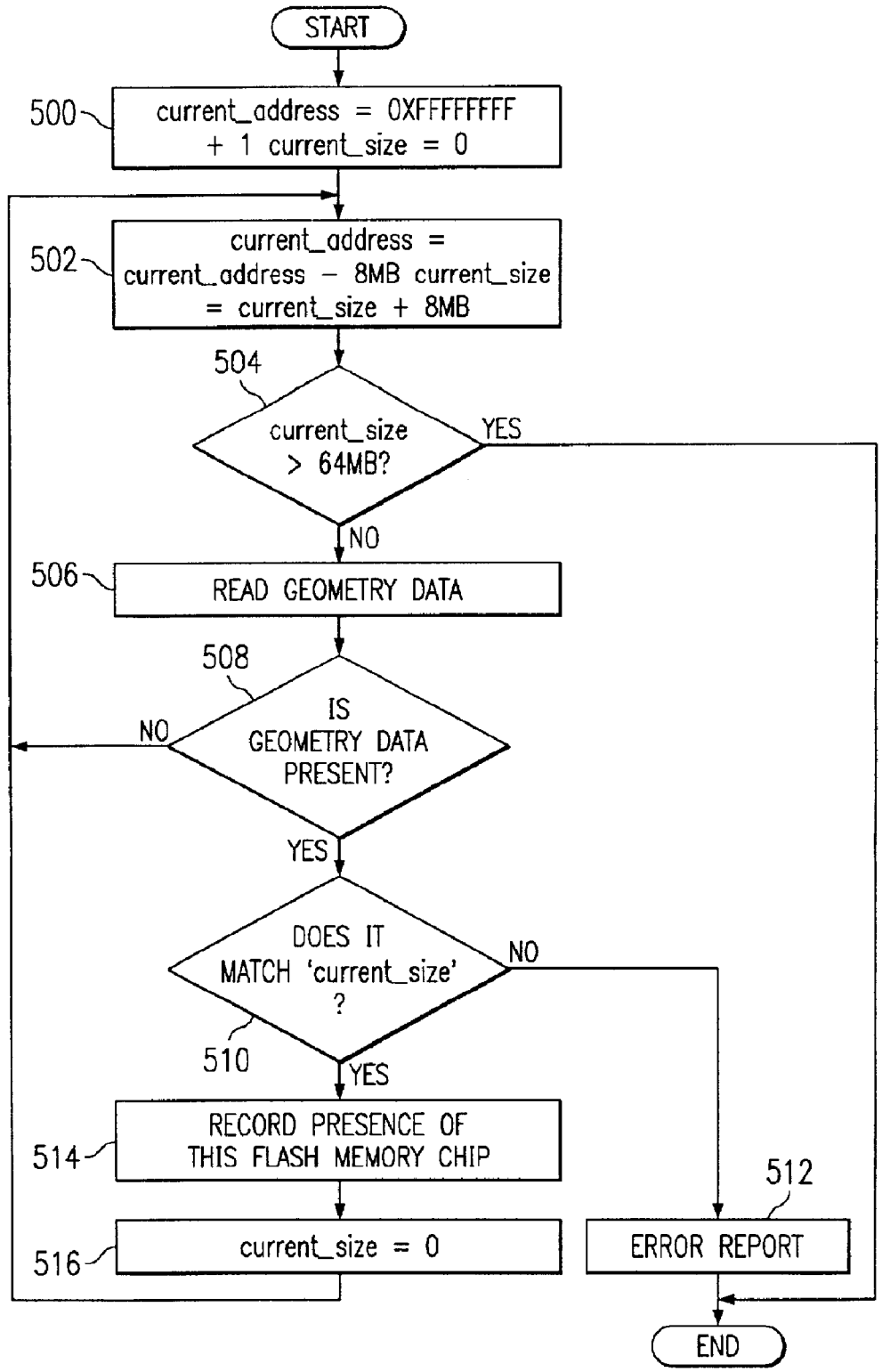
FIG. 5 is a flowchart of a process used to determine the configuration and size of a flash memory in accordance with a preferred embodiment of the present invention.

Turning next to FIG. 5, a flowchart of a process used to determine the configuration and size of a flash memory is depicted in accordance with a preferred embodiment of the present invention. The process illustrated in FIG. 5 is a more detailed description of step 402 in FIG. 4.

The process begins by setting the current address equal to the starting address and setting the current size equal to 0 (step 500). In this example, the current address begins at 0xFFFFFFFF+1, which is the starting address for the example illustrated in FIG. 3. Next, the current address is decremented or decreased by 8 MB while the current size is incremented by 8 MBs (step 502).

Next, a determination is made as to whether current size is greater than 64 MBs (step 504). If current size is not greater than 64 MBs, the geometry data is read (step 506). Next, a determination is made as to whether geometry data is present (step 508). If geometry data is present, a determination is made as to whether it matches the current size (step 510). A mismatch in the current size and geometry information may indicate that a hardware failure has occurred. If the geometry data does not match the current size, an error report is generated (step 512) and the process terminates thereafter.

Referring again to step 510, if the geometry data does match the current size, the presence of the flash memory chip is recorded (step 514). This information may be recorded in a table in which the location and size of each chip is identified. The current size is set to zero (step 516) and the process returns to step 502 as described above. With reference again to step 508, if geometry data is absent, the process returns to step 502 as described above. Referring again to step 504, if the current size is greater than 64 MBs, the process terminates.

Thus, the present invention provides an improved method, apparatus, and computer implemented instructions for identifying configuration and size of a flash memory as part of a process for applying updates. This mechanism allows for the same update program or tool to be used for data processing systems with different sizes or configurations of flash memories.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for updating a flash memory, the method comprising:
   determining a configuration of the flash memory to form an identified configuration; and
   applying a code update to the flash memory based on the identified configuration, wherein the determining step further determines a size of the flash memory.

2. A method in a data processing system for updating a flash memory, the method comprising:
   determining a configuration of the flash memory to form an identified configuration; and
   applying a code update to the flash memory based on the identified configuration, wherein the determining step comprises:
   querying an address within a current section of the flash memory for geometry information;
   selecting an adjacent section of the flash memory as the current section of the flash memory; and
   repeating the querying step and selecting step until a selected amount of memory has been selected without detecting any geometry information.

3. The method of claim 2, wherein the section of memory is an eight megabyte section of memory.

4. The method of claim 3, wherein the selected amount of memory is a 64 megabyte amount of memory.

5. The method of claim 2, wherein a memory chip is identified each time geometry information is detected.

6. The method of claim 2, wherein each section of memory is an eight megabyte section.

7. A method in a data processing system for updating a flash memory, the method comprising:
   scanning, from a starting address, through a selected amount of memory for geometry information;
   continuing to scan through subsequent first selected amounts of memory for geometry information until a second selected amount of memory has been scanned without encountering geometry information;
   recording an identification of a memory chip each time geometry information is encountered;
   identifying a size of the memory based on a number of sections scanned; and
   applying a code update after the continuing step completes.

8. A data processing system for updating a flash memory, the data processing system comprising:

a bus system;

a communications unit connected to the bus system;

a memory connected to the bus system, wherein the memory includes a set of instructions; and a processing unit connected to the bus system, wherein the processing unit executes the set of instructions to scan, from a starting address, through a selected amount of memory for geometry information; continue to scan through subsequent first selected amounts of memory for geometry information until a second selected amount of memory has been scanned without encountering geometry information; record an identification of a memory chip each time geometry information is encountered; identify a size of the memory based on a number of sections scanned; and apply a code update after the continuing step completes.

9. A data processing system for updating a flash memory, the data processing system comprising:

determining means for determining a configuration of the flash memory to form an identified configuration; and applying means for applying a code update to the flash memory based on the identified configuration, wherein the determining means further determines a size of the flash memory.

10. A data processing system for updating a flash memory, the data processing system comprising:

determining means for determining a configuration of the flash memory to form an identified configuration; and applying means for applying a code update to the flash memory based on the identified configuration, wherein the determining means comprises:

querying means for querying an address within a current section of the flash memory for geometry information;

selecting means for selecting an adjacent section of the flash memory as the current section of the flash memory; and repeating means for repeating the querying step and selecting step until a selected amount of memory has been selected without detecting any geometry information.

11. The data processing system of claim 10, wherein the section of memory is an eight megabyte section of memory.

12. The data processing system of claim 11, wherein the selected amount of memory is a 64 megabyte amount of memory.

13. The data processing system of claim 10, wherein a memory chip is identified each time geometry information is detected.

14. The data processing system of claim 10, wherein each section of memory is an eight megabyte section.

15. A data processing system for updating a flash memory, the data processing system comprising:

first scanning means for scanning, from a starting address, through a selected amount of memory for geometry information;

second scanning means for continuing to scan through subsequent first selected amounts of memory for geometry information until a second selected amount of memory has been scanned without encountering geometry information;

recording means for recording an identification of a memory chip each time geometry information is encountered;

identifying means for identifying a size of the memory based on a number of sections scanned; and applying means for applying a code update after the continuing step completes.

16. A computer program product in a computer readable medium for updating a flash memory, the computer program product comprising:

first instructions for scanning, from a starting address, through a selected amount of memory far geometry information;

second instructions for continuing to scan through subsequent first selected amounts of memory for geometry information until a second selected amount of memory has been scanned without encountering geometry information;

third instructions for recording an identification of a memory chip each time geometry information is encountered;

fourth instructions for identifying a size of the memory based on a number of sections scanned; and fifth instructions for applying a code update after the continuing step completes.

* * * * *

UNITED STATES PATENT AND TRADEMARK OFFICE
CERTIFICATE OF CORRECTION

PATENT NO. : 6,907,496 B2
DATED : June 14, 2005
INVENTOR(S) : Langford et al.

It is certified that error appears in the above-identified patent and that said Letters Patent is hereby corrected as shown below:

Title page,
Item [57], ABSTRACT,
Line 1, after "Method" insert -- , --.

Column 8,
Line 27, after "memory" delete "far" and insert -- for --.

Signed and Sealed this

Twenty-fifth Day of April, 2006

JON W. DUDAS
*Director of the United States Patent and Trademark Office*